United States Patent [19]

Okano

[11] Patent Number: 4,838,080

[45] Date of Patent: Jun. 13, 1989

[54] CIRCUIT FOR DISTINGUISHING DETECTED LIFT SIGNAL OF THE VALVE ELEMENT OF FUEL INJECTION VALVE

[75] Inventor: Masami Okano, Higasimatsuyama, Japan

[73] Assignee: Diesel Kiki Co., Ltd., Tokyo, Japan

[21] Appl. No.: 186,076

[22] Filed: Apr. 25, 1988

[30] Foreign Application Priority Data

Apr. 25, 1987 [JP] Japan ................................ 62-101139

[51] Int. Cl.$^4$ ............................................ G01M 15/00

[52] U.S. Cl. .................................................. 73/119 A

[58] Field of Search .................... 123/494; 239/73, 74, 239/71; 73/119 A

[56] References Cited

U.S. PATENT DOCUMENTS 4,023,403 5/1977 Smith .
4,662,564 5/1987 Okuda .
4,669,440 6/1987 Takase et al. .

FOREIGN PATENT DOCUMENTS 56-113044 9/1981 Japan .
57-355 1/1982 Japan .
58-82070 5/1983 Japan .
60-173341 9/1985 Japan .
61-144267 9/1986 Japan .
61-151075 9/1986 Japan .

*Primary Examiner*—Stewart J. Levy
*Assistant Examiner*—Robert R. Raevis
*Attorney, Agent, or Firm*—Wenderoth, Lind & Ponack

[57] ABSTRACT

A fuel injection valve for injecting fuel into an internal combustion engine has a valve element lift sensor for producing an output signal in response to pressure developed by movement of a valve element. A detected valve element lifting signal produced from the valve element lift sensor is shaped into a waveform, and employed to generate a pulse having a pulse duration shorter than a minimum valve element lifting period and longer than the duration of a pulse issued from a waveform shaper after the supply of fuel to the fuel injection valve has been cut off. The generated pulse and the shaped valve element lifting signal are ANDed to remove noise from the output signal of the valve element lift sensor.

4 Claims, 4 Drawing Sheets

FIG.4a
FIG.4b
FIG.4c
FIG.4d
FIG.4e
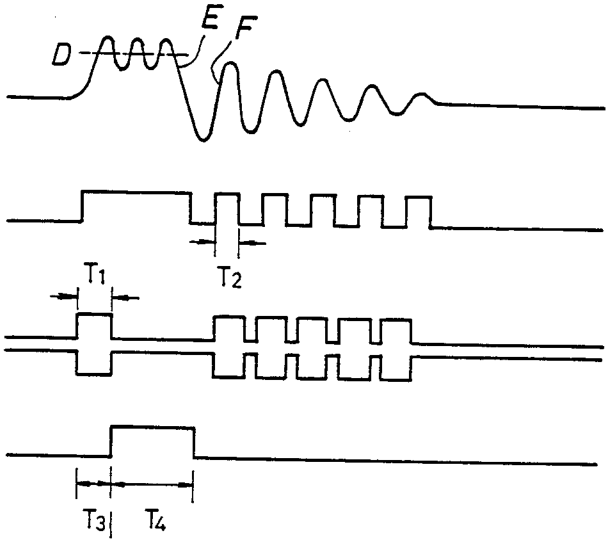
FIG.5a
FIG.5b
FIG.5c
FIG.5d
FIG.5e
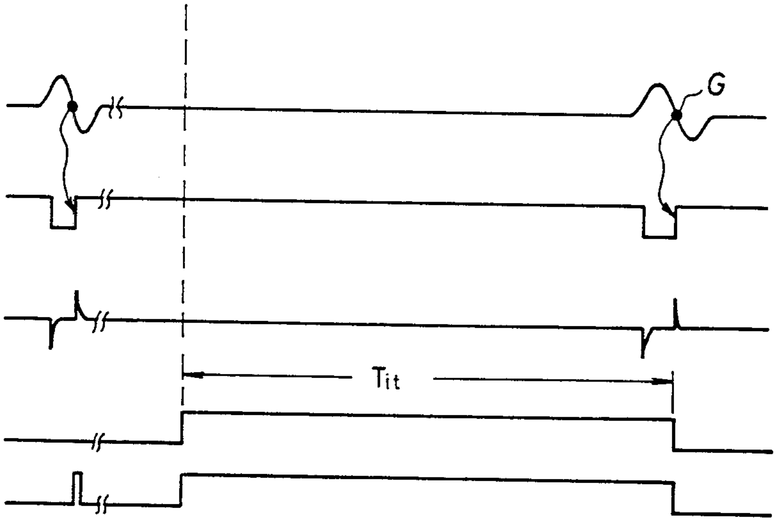

CIRCUIT FOR DISTINGUISHING DETECTED LIFT SIGNAL OF THE VALVE ELEMENT OF FUEL INJECTION VALVE

BACKGROUND OF THE INVENTION

The present invention relates to a circuit for distinguishing a detected signal indicating the lifting of the valve element of a fuel injection valve which injects fuel into an internal combustion engine, and more particularly to a circuit for distinguishing a detected valve element lifting signal while removing noise from the detected valve element lifting signal to effect accurate detection of the fuel injection timing of a fuel injection valve.

The lifting of the valve element of a fuel injection valve is detected, for example, by an output signal which is generated by a pressure-sensitive means such as a piezoelectric element in response to the displacement of a member which is movable with the valve element of the fuel injection valve.

Since the pressure-sensitive means such as a piezoelectric element has a high output impedance, however, the output signal thereof is susceptible to noise, and may even pick up noise caused by the vibration of a valve nozzle spring by which the valve element is normally urged against a valve seat. Therefore, the valve element lifting signal is liable to oscillate due to such noise.

In order to distinguish a detected valve element lifting signal, it has been one conventional practice, as shown in FIG. 6 of the accompanying drawings, to count detected pulses (b) each produced upon detection of the top dead center, after a detected valve element lifting signal (a) has been issued, and to mask the signal for a period T up to a detected pulse (b) which is produced immediately before a next detected valve element lifting signal (a) is generated, thus removing noise from the detected valve element lifting signal.

According to another conventional scheme, as shown in FIG. 7, after a detected valve element lifting signal (a) has been produced, noise is masked or removed from the signal by a one-shot multivibrator.

With the former known signal distinguishing circuit, however, noise produced in a period (FIG. 6) after the masked interval cannot be removed.

The latter known circuit arrangement is disadvantageous in that noise in a period (FIG. 7) cannot be eliminated unless the masked interval according to the one-shot multivibrator is increased. However, if the masked interval is increased, it may also mask a next detected valve element lifting signal when the engine rotates at high speed.

The above two arrangements may be combined into a system in which the signal is unmasked at the time whichever masked interval ends first. Even with this system, however, noise cannot be removed from the period of time after the signal is unmasked until a next cycle of fuel injection is started.

There has also been a circuit arrangement in which the frequency of the vibration of the valve nozzle spring is removed by passing the output signal from the piezoelectric element through a low-pass filter. Where the low-pass filter is of an analog filter, it is difficult to provide a sharp decline in its frequency characteristic curve at the cutoff frequency. If the analog low-pass filter is successfully designed with a sharp cutoff decline in the frequency characteristic curve, then the low-pass filter has difficulty in detecting a positive-going edge of the output signal from the piezoelectric element, with the result being that a large detection delay will be produced.

SUMMARY OF THE INVENTION

It is an object of the present invention to provide a circuit for distinguishing a detected signal indicating the lifting of the valve element of a fuel injection valve while removing noise from the detected valve element lifting signal to effect accurate detection of the fuel injection timing of a fuel injection valve.

To achieve the above object, there is provided a circuit for distinguishing a detected signal indicating the lifting of the valve element of a fuel injection valve having a valve element lift sensor, the circuit comprising: a waveform shaper for converting a detected valve element lifting signal produced in response to pressure developed by movement of the valve element, into a pulse; a pulse generating means triggerable by the pulse from the waveform shaper for producing a pulse having a pulse duration shorter than a minimum valve element lifting period; and a logic processing means for processing the pulse from the waveform shaper and the pulse from the pulse generating means.

Therefore, the detected valve element lifting signal is converted into a pulse, and the pulse generating means is triggered by the pulse output signal from the waveform shaper to produce a pulse having a pulse duration shorter than the minimum valve element lifting period, and longer than the duration of a pulse issued from the waveform shaper after the supply of fuel to the fuel injection valve has been cut off. The pulse from the waveform shaper and the pulse from the pulse generating means are processed to eliminate any pulses from the waveform shaper which have pulse durations shorter than the pulse duration from the pulse generating means. Thus, any input signal to the waveform shaper which is of a pulse duration shorter than the pulse duration of the pulse from the pulse generating means is fully removed as noise.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 4*a* through 4*e*, and 5*a* through 5*e* are timing charts illustrating operation of the circuit of the present invention;

DESCRIPTION OF THE PREFERRED EMBODIMENT

The principles of the present invention are particularly useful when embodied in a circuit for distinguishing a detected signal indicating the lifting of the valve element of a fuel injection valve, incorporated especially in a fuel injection timing measuring device. The circuit as it is employed for the removal of noise produced by a valve nozzle spring will be described by way of example.

First, a fuel injection valve associated with the circuit of the invention will be described below.

Figure 2:
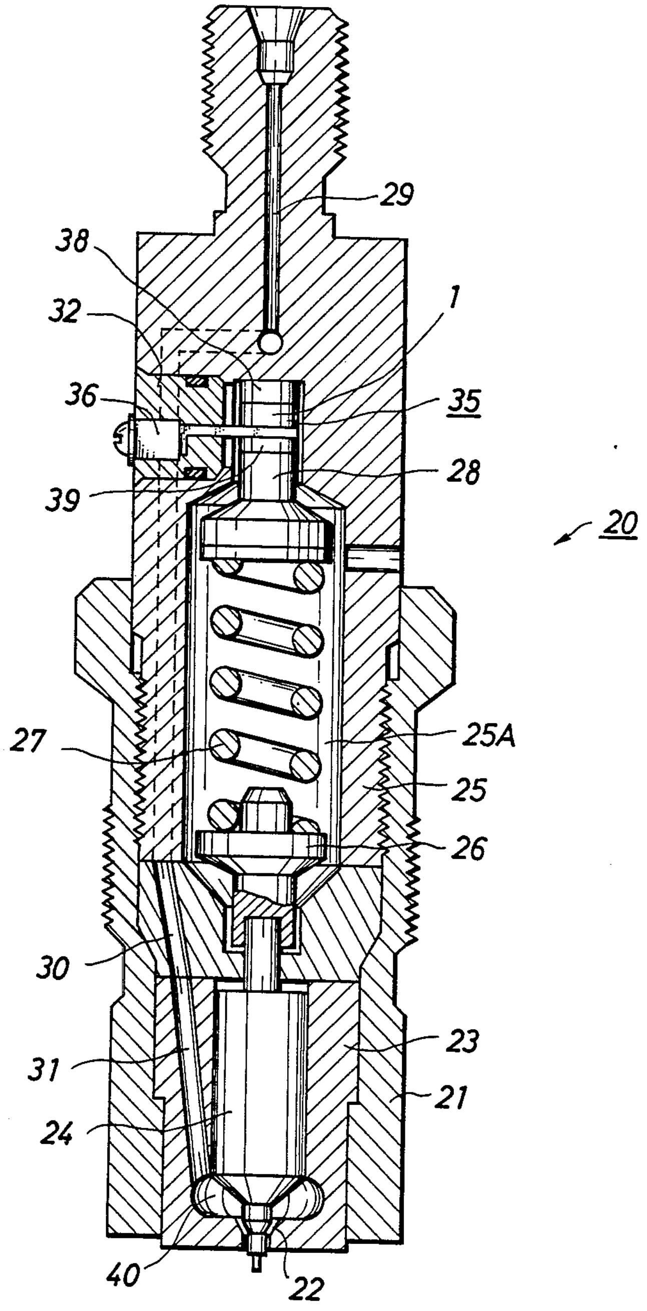
FIG. 2 is a longitudinal cross-sectional view of a fuel injection valve which may be used with the circuit of the present invention.
Figure 6:
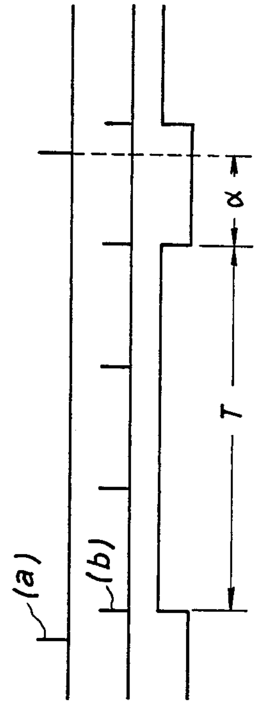
FIG.6 PRIOR ART
FIGS. 6 and 7 are diagrams explaining conventional arrangements.
Figure 7:
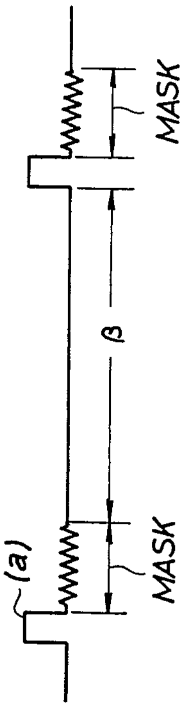
FIG.7 PRIOR ART

FIG. 2 shows in cross section a fuel injection valve 20 having a lift sensor for detecting the lifting of a valve element. The fuel injection valve 20 per se is known in the art from U.S. Pat. No. 4,662,564, for example.

The fuel injection valve 20 includes a nozzle nut 21 to be threaded in an engine head (not shown) and a nozzle body 23 having a valve seat 22 and fitted in the nozzle nut 21. A needle valve 24 serving as a valve element for cooperating with the valve seat 22 in controlling the fuel injection orifice or opening at the valve seat 22 is axially movably fitted in the nozzle body 23. A nozzle holder 25 is threadedly fitted in the nozzle nut 21 for engaging and holding the nozzle body 23 in position axially in the nozzle nut 21.

The needle valve 24 has a rear end over which there is fitted a spring seat 26 extending into a spring chamber 25A defined in the nozzle holder 25. The needle valve 24 is normally urged to close the fuel injection opening at the valve seat 22 by a nozzle spring 27 which is disposed under compression between the spring seat 26 and a spring seat 28 disposed axially remotely from the spring seat 26.

A fuel reservoir 40 is defined between the nozzle body 23 and the needle valve 24 in communication with the fuel injection opening. The fuel reservoir 40 is supplied with fuel from a fuel tank via fuel supply passages 29, 30, 31. When fuel is supplied to the fuel reservoir 40, the pressure of the supplied fuel is applied to the conical taper surface of the needle valve 24 in the fuel reservoir 40 for lifting the needle valve 24 axially against the resiliency of the nozzle spring 27. The fuel injection opening is now opened between the valve seat 22 and the needle valve 24 to inject fuel therethrough into an engine cylinder (not shown). The nozzle nut 21, the nozzle body 23, the needle valve 24, the nozzle holder 25, the spring seats 26, 28, and the nozzle spring 27 are made of an electrically conductive material or materials.

A valve element lift sensor 35 is disposed between the spring seat 28 and the nozzle holder 25 for generating an output signal corresponding to the force applied by the spring seat 28. The output signal from the valve element lift sensor 35 is picked up from a lead-out conductor 36 extending through an insulator 32 sealingly fitted in the nozzle holder 25 and extending to the spring chamber 25A. The valve element lift sensor 35 includes a piezoelectric element 1 made of a ceramic material, for example. The piezoelectric element 1 has one electrode surface held against the nozzle holder 25 through a conductor 38 bonded to the electrode surface by an electrically conductive adhesive. The other electrode surface of the piezoelectric element 1 is held against the spring seat 28 through an insulator 39 bonded to the electrode surface by an adhesive, and is electrically connected to the lead-out conductor 36. The one electrode surface of the piezoelectric element 1 is grounded through the conductor 38 and the nozzle holder 25, whereas the other electrode surface is electrically insulated from the fuel injection valve 20, thus allowing the output signal from the valve element lift sensor 35 to be picked up from the lead-out conductor 36.

When the needle valve 24 is lifted by introducing fuel into the fuel reservoir 40 via the passages 29, 30, 31, the spring seat 26 compresses the nozzle spring 27 to increase the force acting on the piezoelectric element 1 through the spring seat 28. As a result, the piezoelectric element 1 generates a voltage commensurate with the rate of change of the force applied thereto. Therefore, the piezoelectric element 1 produces ah output voltage dependent on the acceleration or deceleration of movement of the needle valve 24.

Figure 1:
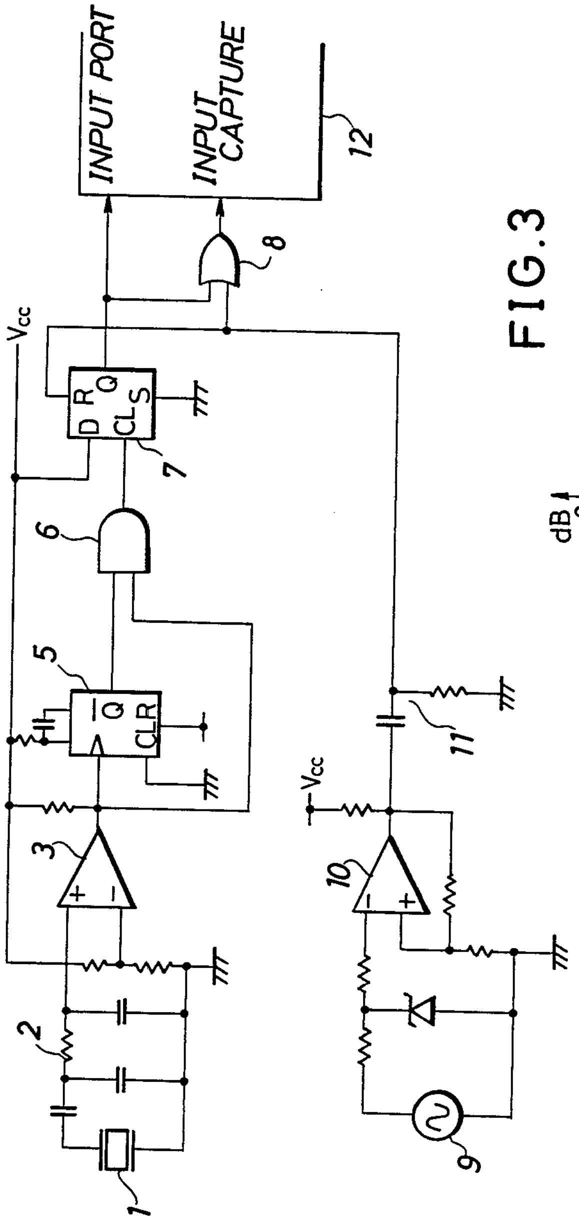
FIG. 1 is a circuit diagram of a distinguishing circuit according to the present invention.

Referring back to FIG. 1, the output signal from the piezoelement element 1 of the valve element lift sensor 35 is supplied through a bandpass filter 2 to one input terminal of a comparator 3 serving as a waveform shaper means. The comparator 3 is supplied at its other input terminal with a reference voltage produced by dividing a power supply voltage Vcc. The comparator 3 converts the output signal supplied from the piezoelectric element 1 through the bandpass filter 2 into a pulse signal. The comparator 3 generates a positive output signal, for example, when an input signal exceeding the reference voltage is applied thereto. A one-shot multivibrator 5 is triggered by a positive-going edge of the output signal from the comparator 3. A $\overline{Q}$ output signal from the one-shot multivibrator 5 and the output signal from the comparator 3 are ANDed by an AND gate 6. An output signal from the AND gate 6 is supplied as a clock signal to a D flip-flop 7, from which a Q output signal is supplied to a microcomputer 12 to which an input signal is also applied from an OR gate 8 (described later on). In response to these input signals, the microcomputer 12 calculates an angle (indicated by $\theta$) by which the timing to start fuel injection precedes a top dead sender (T.D.C.)

A reference signal generator 9 generates a reference signal, e.g., a T.D.C. (top dead center) pulse.

The reference signal generator 9 comprises a known sensor for detecting a timing at which piston in the engine reaches a T.D.C., and producing a reference signal (T.D.C. pulse) which is supplied to a zero-crossing detector 10 having hysteresis for detecting a zero-crossing point of the T.D.C. pulse. The zero-crossing detector 10 produces an output signal which resets the flip-flop 7. The Q output signal from the flip-flop 7 and an output signal from a differentiator 11 are ORed by the OR gate 8, which then applies its output signal as an input capture signal to the microcomputer 12.

Figure 3:
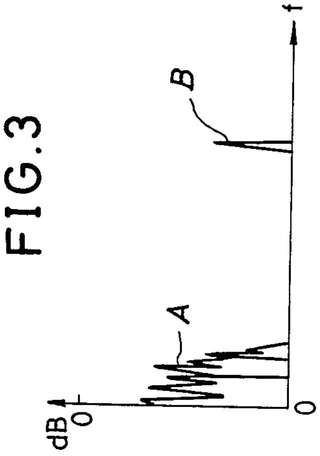
FIG. 3 is a graph showing a frequency distribution of a detected valve element lifting signal and a resonant frequency of a spring.

An output signal produced from the piezoelectric element 1 upon the lifting of the valve element of the fuel injection valve 20 has a frequency distribution A as shown in FIG. 3. An output signal produced from the piezoelectric element 1 when the nozzle spring 27 resonates has a frequency distribution B as shown in FIG. 3. The frequency distribution A of the valve element lifting output signal from the piezoelectric element 1 and the resonant frequency B of the nozzle spring 27 are therefore different from each other. The period in which the fuel injection valve 20 is open is longer than ½ of the period of the resonant output signal from the nozzle spring 27. Assuming that the resonant frequency of the nozzle spring 27 is 3 kHz, its half-wave period $T_2$ (see FIG. 4(*b*)) is about 160 μs. It is preferable that the pulse duration $T_1$ see FIG. 4(*c*)) of the output signal from the one-shot multivibrator 5 be slightly longer than the period $T_2$ (=160 μs) and shorter than the minimum period of needle valve lifting i.e., the minimum period of time during which the needle valve 24 is being lifted in one lifting cycle thereof, e.g., the period of 200 μs.

When the fuel injection valve 20 is opened, the piezoelectric element 1 produces an output signal as shown in FIG. 4(*a*). This output signal has a level D because the pressure from the nozzle spring 27 is repeatedly applied to the piezoelectric element 1 so that charges are not completely removed from the piezoelectric element 1. Thus, the output signal is shifted positively by the level D. After the valve element is closed, the output signal from the piezoelectric element 1 due to the resonant frequency of the nozzle spring 27 has damping oscillation. The first negative-going edge E of the output signal after the valve element is closed is steeper than the signal edge when fuel injection is started since the pressure drop in the fuel injection valve 20 is quick after the pressure-feed of the fuel is completed. The following positive-going edge F of the oscillating output signal rises quickly in response to the steep gradient of the negative-going edge E.

In response to the output signal (FIG. 4(*a*)) from the piezoelectric element 1, the comparator 3 issues an output signal as shown in FIG. 4(*b*). The one-shot multivibrator 5 is triggered by positive-going edges of the output signal illustrated in FIG. 4(*b*) to produce output signals as shown in FIGS. 4(*c*) and 4(*d*). FIG. 4(*c*) shows the waveform of the Q output signal from the one-shot multivibrator 5, whereas FIG. 4(*d*) shows the waveform of the $\overline{Q}$ output signal from the one-shot multivibrator 5. In FIGS. 4(*b*) and 4(*c*), $T_1 > T_2$ as described above.

The output signal (FIG. 4(*b*)) from ,the comparator 3 and the $\overline{Q}$ output signal (FIG. 4(*d*)) from the one-shot multivibrator 5 are ANDed by the AND gate 6, which produces an output signal as shown in FIG. 4(*e*). In FIG. 4(*e*), the pulses having pulse durations $T_2$ (FIG. 4(*b*), i.e., noise subsequent to the edge F of FIG. 4(*a*) is thoroughly removed from the output signal of the AND gate 6. The output signal of FIG. 4(*e*) indicates fuel injection starting timing because the output signal of the AND gate 6 is a pulse having a pulse duration $T_4$, and the period $T_3$ prior to the positive-going edge thereof is equal to the pulse duration $T_1$ of the output signal from the one-shot multivibrator 5.

The reference signal generator 9 produces an output signal as shown in FIG. 5(*a*) which is supplied to the zero-crossing detector 10 that comprises an operational amplifier. The output voltage from the zero-crossing detector 10 is divided and fed back to a noninverting input terminal of the operational amplifier. The zero-crossing detector 10 has a reference level slightly higher than the zero potential when the input signal level increases, and a reference level equal to the zero potential when the input signal level decreases. Therefore, the zero-crossing detector 10 issues an output signal as shown in FIG. 5(*b*). A point G on the reference output waveform is set to come after the period $T_1$ is over. The positive-going and negative-going edges of the output signal from the zero-crossing detector 10 are differentiated by the differentiator 11, which produces an output signal as shown in FIG. 5(*c*). The D flip-flop 7 is reset by the positive-going edges of the output signal from the differentiator 11 to produce an output signal having a pulse duration Tit as shown in FIG. 5(*d*). The OR gate 8 generates an output siganl as illustrated in FIG. 5(*e*).

In response to the signal from the OR gate 8, the microcomputer 12 stores a count of output pulses from a free-running oscillator (not shown) during an interval from positive-going to negative-going edges of the applied signal. Upon determination of a fuel injection starting signal based on the signal from the D flit-flop 7, the microcomputer 12 detects an engine rotational speed N (r.p.m.) and a pulse duration Tit based on the stored count. Since the pulse duration Tit is shorter by the period $T_3$ ($=T_1$), it is corrected into $Tit^* = Tit + T_1$ using the value of $T_3$ which has been stored in a ROM. Then, the microcomputer 12 calculates an angle ($\theta$) by which the timing to start fuel injection precedes a T.D.C., using the data N,Tit*.

In the above embodiment, the valve element lifting signal is produced by the piezoelectric element. Where the lifting movement of the valve element is converted to an inductance, and a valve element lifting signal is produced from such an inductance, the valve element lifting signal is also subject to the vibration of the nozzle spring. The illustrated embodiment of the invention is also effective to remove noise from such valve element lifting signal.

While the present invention has been described as removing noise produced by the nozzle spring, the circuit of the present invention can also be employed to remove other noise.

With the present invention, as described above, the detected valve element lifting signal is supplied to the waveform shaper means and converted thereby into a pulse, and the pulse generating means for generating a pulse shorter than the minimum valve element lifting period is triggered by an output signal from the waveform shaper means. The output signal from the pulse generating means and the output signal from the waveform shaping means are processed in a logical operation to produce a signal which continues for an interval longer than the pulse duration of the output signal from the pulse generating means, the signal being substantially idential to the detected valve element lifting signal. Any input signal applied to the waveform shaper means, which has a pulse duration shorter than the above signal interval, is completely removed as noise.

Although a certain preferred embodiment has been shown and described, it should be understood that many changes and modifications may be made therein without departing from the scope of the appended claims.

What is claimed is:

1. A circuit for distinguishing a detected signal indicating the lifting of the valve element of a fuel injection valve having a valve element lift sensor including pressure-sensitive means positioned for being pressed by the valve element, said circuit comprising:

a waveform shaper for converting a detected valve element lifting signal produced by said valve element lift sensor into a first pulse;

pulse generating means triggerable by said first pulse from said waveform shaper for producing a second pulse having a pulse duration shorter than the minimum period of time during which the valve element is being lifted in one lifting cycle thereof, and longer than the duration of a first pulse issued from said waveform shaper after the supply of fuel to the fuel injection valve has been cut off; and logic processing means for processing the first pulse from said waveform shaper and the second pulse from said pulse generating means to remove an output signals from said valve element lift sensor after fuel has been fed to said fuel injection valve.

* * * * *

2. A circuit according to claim 1, wherein said waveform shaper comprises a comparator.

3. A circuit according to claim 1, wherein said pulse generating means comprises a one-shot multivibrator.

4. A circuit according the claim 1, wherein said waveform shaper comprises a comparator for generating said first pulse, issued from the waveform shaper, of a prescribed polarity when said lifting signal in excess of a reference voltage is applied thereto, and wherein said pulse generating means comprises a one-shot multivibrator triggerable by a leading edge of said first pulse from said comparator for generating said second pulse, from the pulse generating means, of a polarity opposite to said prescribed polarity, and wherein said logic processing means comprises an AND gate.

* * * * *